United States Patent [19]
Khaira

[11] Patent Number: 5,574,867
[45] Date of Patent: Nov. 12, 1996

[54] FAST FIRST-COME FIRST SERVED ARBITRATION METHOD

[75] Inventor: Manpreet S. Khaira, Beaverton, Oreg.

[73] Assignee: Intel Corporation, Santa Clara, Calif.

[21] Appl. No.: 273,027

[22] Filed: Jul. 8, 1994

[51] Int. Cl.⁶ .................................................. G06F 13/00
[52] U.S. Cl. .......................... 395/293; 395/287; 395/303; 395/732
[58] Field of Search ..................................... 395/725, 325, 395/293, 287, 303, 732

[56] References Cited

U.S. PATENT DOCUMENTS

| 5,289,583 | 2/1994 | Fischer et al. | 395/325 |
| 5,303,391 | 4/1994 | Simcoe et al. | 395/725 |

Primary Examiner—Jack B. Harvey
Assistant Examiner—John Travis
Attorney, Agent, or Firm—Blakely, Sokoloff, Taylor & Zafman

[57] ABSTRACT

A first-come-first-serve ("FCFS") scheduler that routes requests from two or more clients to a single resource. The FCFS scheduler contains a time stamp mechanism which provides a time stamp for each request. The scheduler provides resource access to the client with the oldest generated request and under a predetermined priority scheme in the event of simultaneous requests. The time stamps are generated by adders which add the current value of a time stamp counter with the number of client requests. The time stamp counter is incremented by the output of the adders. The updated value of the counter is decoded into a time stamp output value stored within time stamp registers. A hifind circuit reads the registers and generates an output signal associated with the set of registers, and corresponding client request, with the lowest time stamp. The output signal allows the client to access the resource.

24 Claims, 6 Drawing Sheets

5,574,867

FAST FIRST-COME FIRST SERVED ARBITRATION METHOD

BACKGROUND OF THE INVENTION

1. Field of the Invention

The present invention relates to a first come first serve mechanism that controls the access to a single resource by at least two clients.

2. Description of Related Art

Computer architectures are sometimes configured so that two or more clients access the same resource. For example, a plurality of microprocessors may request access to another processor or a memory device. A system with two clients seeking access to the same resource may result in a situation where the resource receives conflicting request, simultaneous request and deadlock. To prevent these undesirable events from occurring, many systems employ an arbitration mechanism to schedule and route the request from the clients to the resource. Existing arbitration mechanisms typically include a first-come-first-serve (FCFS) scheduler that contains a first-in-first-out (FIFO) queue. FIFO queues are relatively slow and are subject to request contention when two or more request are simultaneously received by the arbitration mechanism. It would be desirable to provide a FCFS scheduler that was relatively fast, and was not susceptible to either deadlock or node contention.

SUMMARY OF THE INVENTION

The present invention is a first-come-first-serve ("FCFS") scheduler that allows two or more clients to share a single resource. The FCFS scheduler contains a time stamp mechanism which provides a time stamp for each request. The scheduler provides resource access to the client with the oldest generated request. If the clients generate simultaneous request, the scheduler provides access to the resource in accordance with a predetermined priority. The time stamps are generated by adders which add the current value of a time stamp counter with the number of client request. The time stamp counter is incremented by the output of the adders. The updated value of the counter is decoded into a time stamp output value which is stored within time stamp registers. A hifind circuit reads the registers and grants resource access to the client with the lowest time stamp output value. The FCFS scheduler provides exclusive access to the resource until the selected client has completed the request.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

Figure 1:
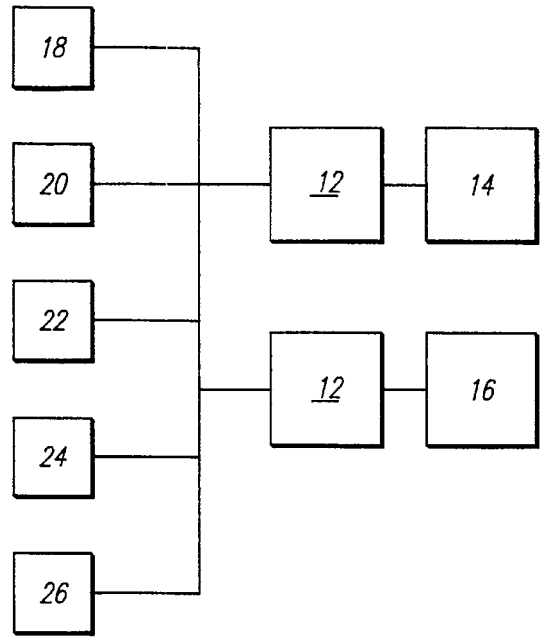
FIG. 1 is a schematic of a system of the present invention which contains a FCFS scheduler that schedules and routes access request between a resource and a plurality of clients.

Referring to the drawings more particularly by reference numbers, FIG. 1 shows a schematic of a system 10 that contains first-come-first-serve (FCFS) schedulers 12 of the present invention. Each scheduler 12 is dedicated to a specific resource 14 and 16. The schedulers 12 are also coupled to a number of clients 18–26. The clients 18–26 generate request to access the resources 14 and 16. The clients 18–26 may be any type of device that seeks access to a resource. By way of example, each client may be a microprocessor which seeks access to a resource such as another microprocessor. Although microprocessors are described, it is to be understood that both the clients and the resources can be other devices. Additionally, although 5 clients and 2 resources are shown, it is to be understood that any number of clients and resources can be used with the schedulers 12 of the present invention.

The schedulers 12 receive resource access request from the clients and provide access to the resource in accordance with a predetermined hierarchy. Each scheduler 12 provides resource access to the first client to generate an access request. The client is provided exclusive access to the resource until access is no longer required by the client. Additionally, the scheduler 12 can provide exclusive access for one client even when one or more clients generate an access request that is simultaneously received by the scheduler 12. The FCFS scheduler prevents node contention by providing resource access in accordance with a predetermined priority scheme applied to the simultaneously received client access request. In this manner, one client is provided exclusive access, then the next client and so forth and so On.

Figure 2:
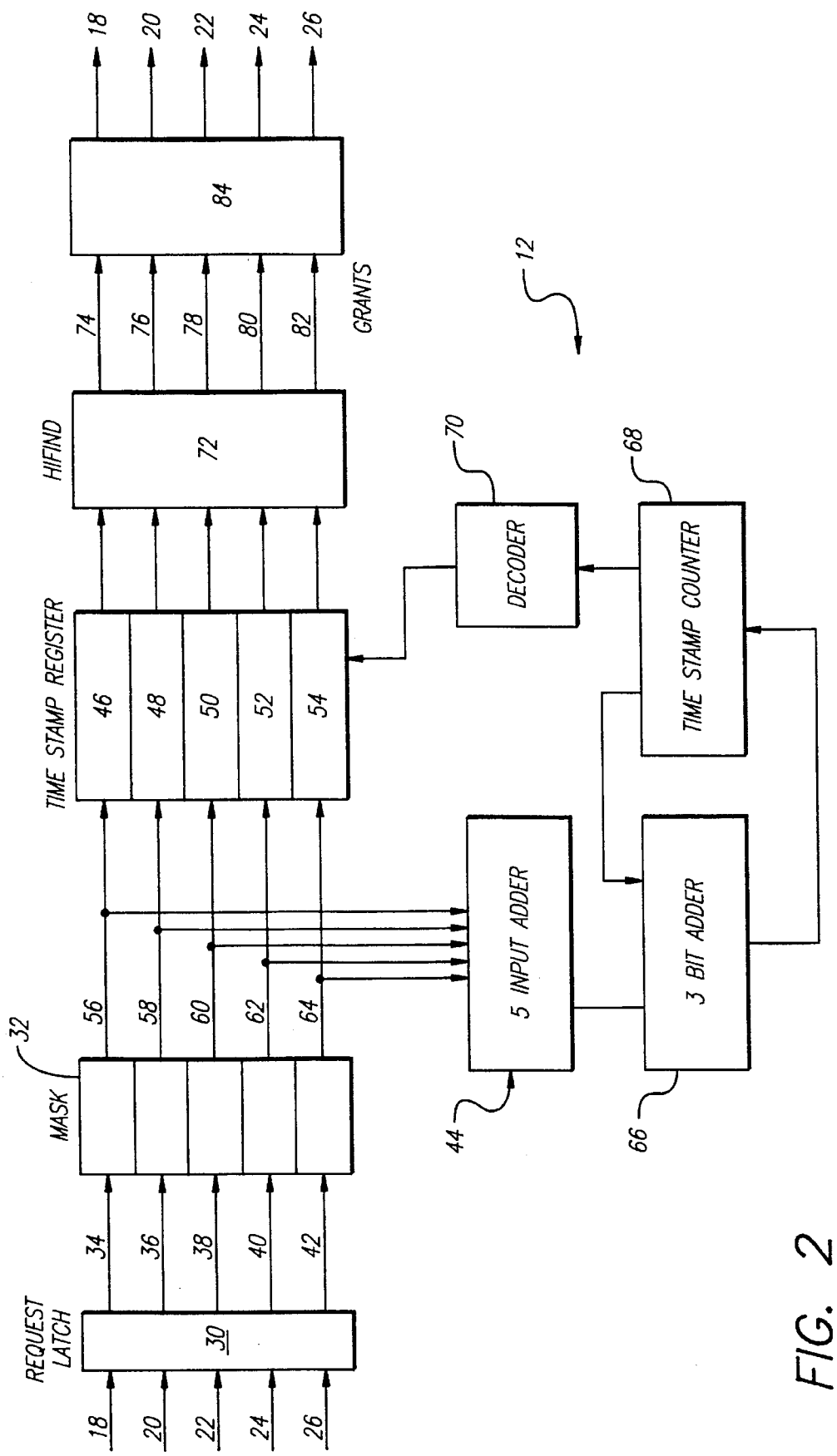
FIG. 2 is a schematic of a FCFS scheduler of the present invention.

FIG. 2 shows a schematic of a FCFS scheduler 12 of the present invention. The scheduler 12 includes a request latch 30 that latches in the access request from the clients and generate access request signals on busses 34–42. Each bus 34–42 is dedicated to a corresponding client 18–26. The request signals can be masked by masking circuits 32. The masking circuits 32 generate output signals that are provided to a first adder 44 and a plurality of time stamp registers 46–54 on dedicated lines 56–64.

The first adder 44 adds the output signals of the masking circuits 32 and generates a first adder output value to a second adder 66. The second adder 66 adds the first adder output value with the current time stamp counter value of a time stamp counter 68. The time stamp counter 68 is incremented to a second time stamp counter value by the sum of the second adder 66. The second time stamp counter value is decoded by decoder 70 which provides a unary time stamp output value to registers 46–54. The registers 46–54 are enabled by the output of the mask circuit 32, such that the unary time stamp output values are stored in the registers that correlate to the lines that have an active time stamp input signal. For a system with N clients the scheduler will have N busses, dedicated mask lines and rows of registers. For a system with 5 clients, the first adder is preferably a 5 bit unary adder 44 and the second adder 66 is preferably a 3 bit binary adder. The decoder 70 preferably provides a 5 bit output that is stored in the time stamp registers 46–54. The adders, decoder output value and registers can be scaled in accordance with the number of clients coupled to the resource.

The time stamp registers 46–54 are coupled to a hifind circuit 72. The hifind circuit 72 reads the least significant bit of each row of registers and grants access to the resource for the client with an enabled least significant bit. If more than one row of registers contains an enabled least significant bit, the hifind circuit 72 prioritizes the request contention request so that only one client is allowed access to the resource at a time. By way of example, if registers 46 and 48 both have enabled least significant bits, the hifind circuit 72 may grant resource access to client 18 first and client 20 second. The prioritizing of the hifind circuit 72 allows the scheduler to receive simultaneous access request from one or more clients, without creating a contention at the mechanism.

The hifind circuit 72 generates an output signal on one of the dedicated lines 74–82 which corresponds to a row of registers which has the least significant bit (LSB) enabled. The output signal of the hifind circuit 72 is provided to a grant latch 84. The grant latch 84 provides an enabling signal to a client that allows the selected client to access the resource. The enabling signal is asserted by the grant latch until the client no longer requires access to the resource. When the granted client has relinquished control of the resource, the registers are shifted to the right by one bit, except for any registers which have a non-granted enabled least significant bit. The time stamp counter is also decremented one unit.

In the preferred embodiment, for a 5 client system, the decoder 70 generates one of the following 5 bit strings, shown with the associated value of the time stamp counter.

0–00001

1–00010

2–00100

3–01000

4–10000

The above listed bit strings prevent a row of registers from inadvertently asserting the least significant bit when the registers are shifted to the right.

Figure 3:
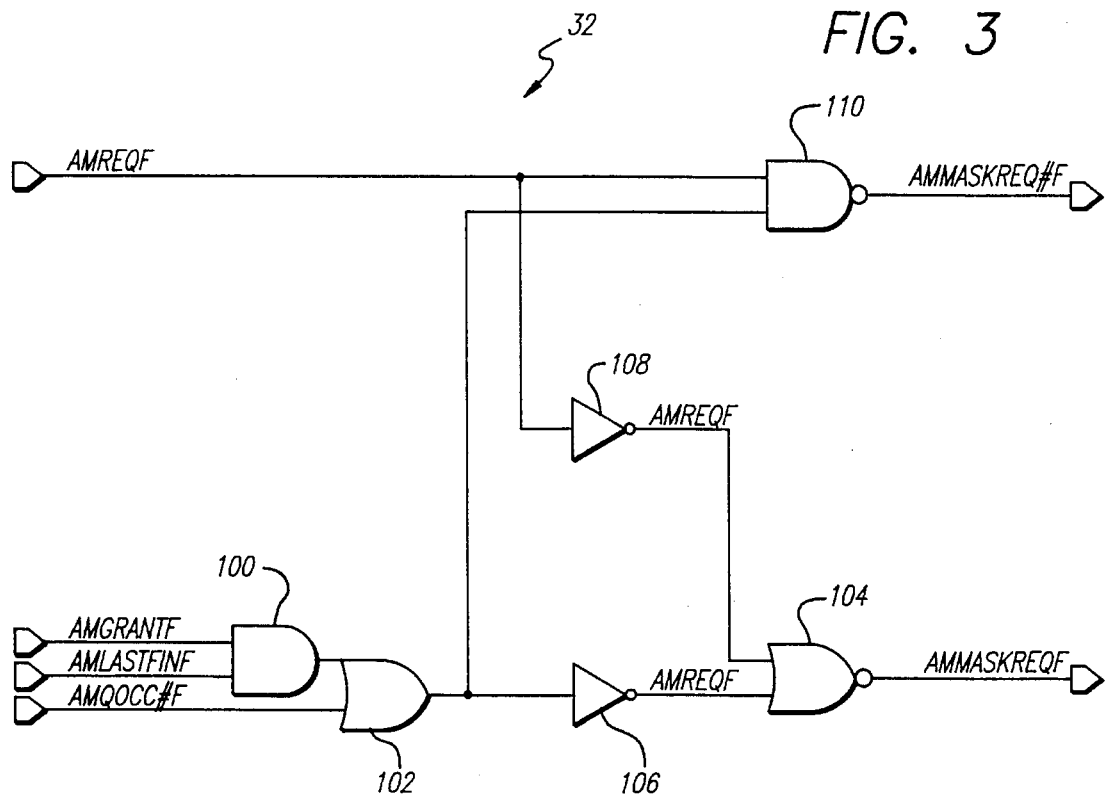
FIG. 3 is a schematic of a mask circuit of the scheduler.

FIGS. 3 shows a preferred embodiment of a mask circuit 32 associated with one of the clients 18–26 and registers 46–54. The mask circuit 32 has an AND gate 100 connected to an OR gate 102. The output of the OR gate 102 is coupled to a NOR gate 104 by an inverter 106. The other input of the NOR gate 104 is coupled to pin AMREQF by inverter 108. The AND 100 input pin AMGRANTF is driven active by the client when access to the resource has been granted. The AND 100 input pin AMLASTFINF is driven active by the client when access to the resource has been completed. By driving the pins AMGRANTF and AMLASTFINF active, a client is capable of obtaining access to the resource without losing a clock cycle. The OR 102 input pin AMQOCC#F is driven inactive when the corresponding register has a nonzero value. The AMQOCC#F pin prevents the corresponding register to be reloaded with a time stamp value if the register already contains a time stamp value. The NOR 104 output pin AMMASKREQF is driven active if the client request an access to the resource by driving pin AMREQF active. The mask circuit 32 also has a NAND gate 110 which provides an inverted output signal AMMASKREQ#F.

Figure 4:
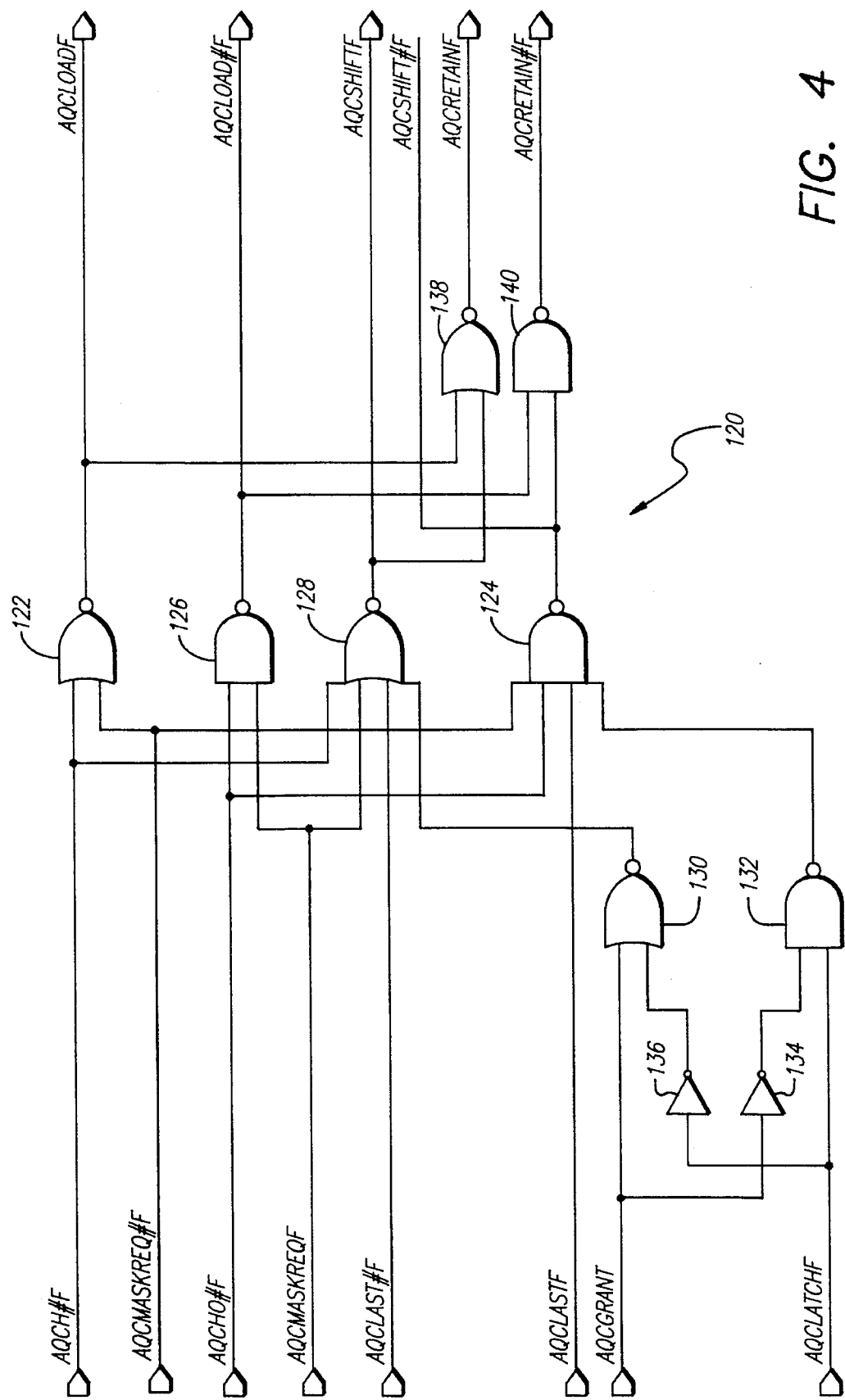
FIG. 4 is a schematic of a control circuit of the scheduler.

FIG. 4 shows a preferred embodiment of a control circuit 120 that controls one of the registers 46–54. The control circuit 120 has a NOR gate 122 with an input connected to the inverted output AMMASKREQ#F of the corresponding mask circuit 32. The inverted mask output signal AMMASKREQ#F is also provided to NAND gate 124. The mask output signal AMMASKREQF is provided to NAND gate 126 and NOR gate 128. The NOR gate 122 and NANO gate 126 are also connected to pins ACCCHOF and AQCH#F which are normally low and high, respectively.

NOR gate 128 and NAND gate 124 are connected to NOR gate 130 and NAND gate 132, respectively. NAND gate 132 is connected to input pin AQCGRANT by inverter 134. Like the AMGRANTF input pin of the mask circuit 32, the AQCGRANT pin is driven active when the client's access request has been granted. The NOR gate 130 is coupled to input pin AQCLATCHF by inverter 136. The AQCLATCHF pin is driven active when the least significant bit of the associated register is a nonzero value. The NAND gate 124 is also connected to input pin AQCLASTF which is driven active when the client has finished accessing the resource.

The NOR gate 122 provides an output signal AQCLOADF which is driven active when the unary value of the decoder is to be loaded into the corresponding register. NAND gate AQCLOAD#F provides an inverted output signal AQCLOAD#F. NOR gate 128 provides an output signal AQCSHIFTF which is driven active when the contents of the corresponding register is to be shifted one bit to the right. The output of the NAND gate 124 provides an inverted output signal AQCSHIFT#F.

The outputs of NOR gates 122 and 128 are also provided to NOR gate 138. NOR gate 138 provides an output signal AQCRETAINF when the contents of the corresponding register are to be retained. NAND gate 140 is coupled to NAND gates 124 and 126, and provides an inverted output signal AQCRETAIN#F.

Figure 5:
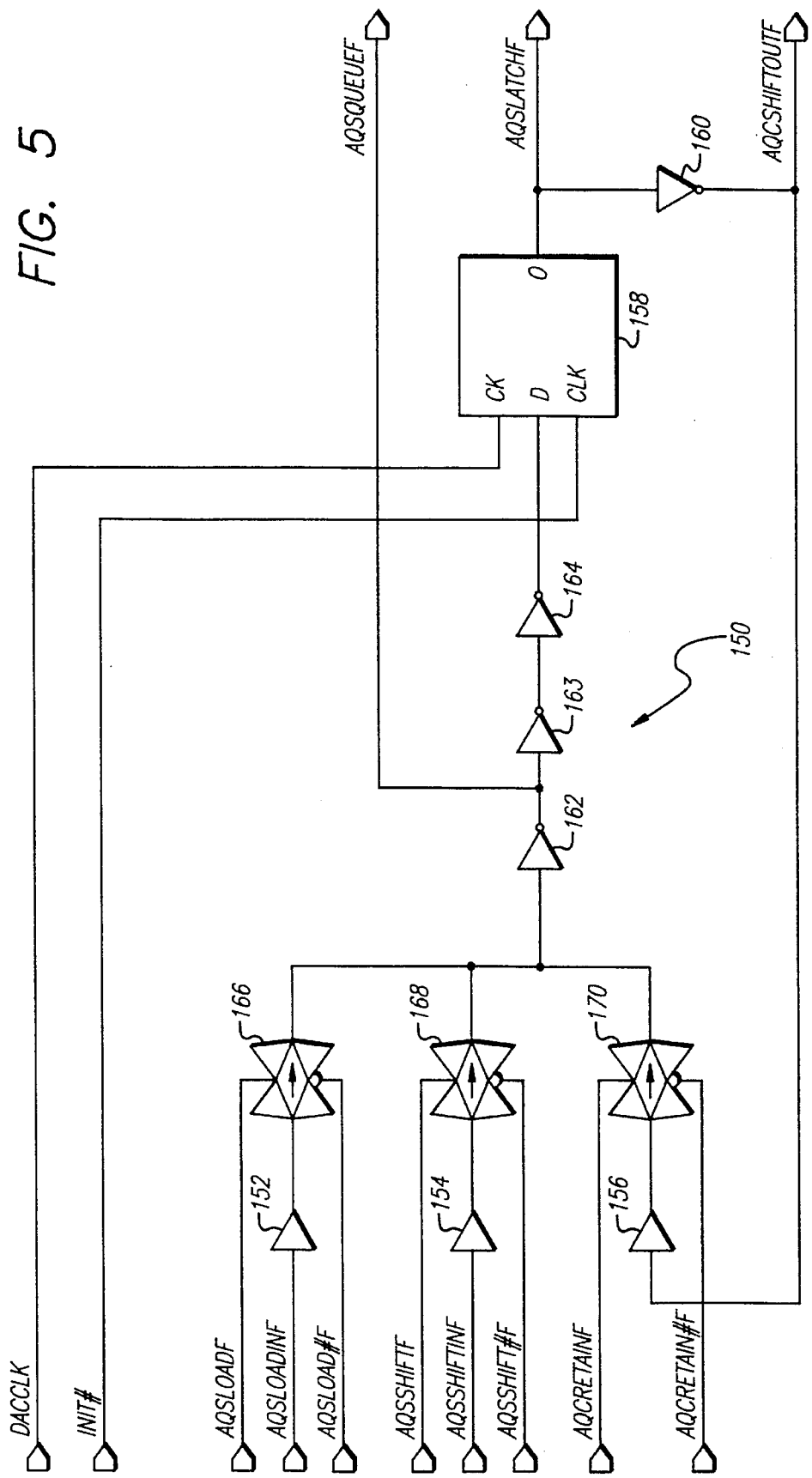
FIG. 5 is a schematic of a single bit of a register of the scheduler.

FIG. 5 shows a single bit circuit 150 of one of the registers 46–54. For a 5 bit register, there are 5 separate bit circuits 150 similar to the circuit shown in FIG. 5. The bit shown is the least significant bit of a register. The bit circuit 150 has input data buffers 152–156. Data buffer 152 is connected to input signal AQSLOADINF which carries inverted bit of the unary value provided by the decoder 70 and corresponding time stamp counter 68. Data buffer 154 is connected to the input signal AQSSHIFTINF which carries the inverted value of the value of the adjacent bit in the register. Buffer 156 is coupled to the output pin of flip flop 158 by inverter 160.

The outputs of data buffers 152–156 are connected to the input pin of the flip flop 158 by inverters 160 and 162. The input to the flip flop 158 is controlled by multiplexers (MUX) 166–170. The select pin of MUX 166 is connected to the AQSLOADF and AQSLOAD#F signals of the control circuit 120. When the AQSLOADF pin is driven active, the content of data buffer 152 is loaded into flip flop 158. Likewise, MUX 168 is coupled to output signals AQSSHIFTF and AQSSHIFT#F, such that the content of data buffer 154 is loaded into the flip flop 158 when the AQSSHIFTF pin is driven active. The MUX 170 loads the inverted output of the flip flop 158 back into the input pin of the flop through inverters 162–64, when the AQCRETAIN#F is driven active.

The clock pin of the flip flop 158 is connected to clock input signal DACCLK which provides clock signals to the flip flop 158 to latch in the input data. The clear pin of the flip flop 158 is connected to input signal INIT# which can clear the output of the flip flop 158. The output signal of inverter 162 AQSQUEUEF signal is provided to the hifind circuit 72. The output signal of the flip flop 158 AQSLATCHF is also provided to the hifind circuit 72 and represents the contents of the register.

Referring to FIGS. 3–5, when a client requests access to the resource, the AWREQF input pin of the mask circuit 32 for the corresponding client is driven active. The mask circuit 32 generates an active AMMASKREQF output signal in response to the client access request. The inverted AMMASKREQ#F output signal of the mask circuit 32 causes the NOR gate 122 of the control circuit 120 to generate an active AQCLOADF output signal.

Upon receiving the AQCLOADF signal, the multiplexers 166 of each bit in the corresponding register allow the contents of the data buffers 152 to be loaded into the flip flops 158 of the bit circuits 150. The buffer content of the least significant bit is latched into the flip flop 158 and provided to the hifind circuit 72 on output pin AQSLATCHF. The content of the data buffer in the least significant bit was also provided to the hifind circuit on AQSQUEUEF. Providing the content of the buffer directly to the hifind 72 on pin AQSQUEUEF allows the hifind circuit 72 to read the register contents without waiting for a clock signal to latch the data into flip flop 158.

When the client is finished with the resource, the AMREQF pin is deactivated, the AQCLASTF pin of the control circuit 120 is activated and the inverted input pin AQCLAST#F is driven inactive. Driving the inverted input pin AQCLAST#F inactive cause the NOR gate 128 to provide an active AQCSHIFT output signal. The AQCSHIFT output signal selects the MUX 168 so that the content of the data buffer 154, corresponding to the content of the adjacent bit of the register, is latched onto the output pin AQSLATCF by flip flop 158. If the client was not granted a request by the hifind circuit 72 the AQCLATCHF signal of the control circuit 120 is driven active, which drives active the AQCRETAINF output pin and inactivates the AQCSHIFTF pin. The AQCRETAINF output signal selects the MUX 170 to load the output of the flip flop 158 back into the input pin of the flop 158. The AQCRETAINF signal maintains the contents of the register.

Figure 6:
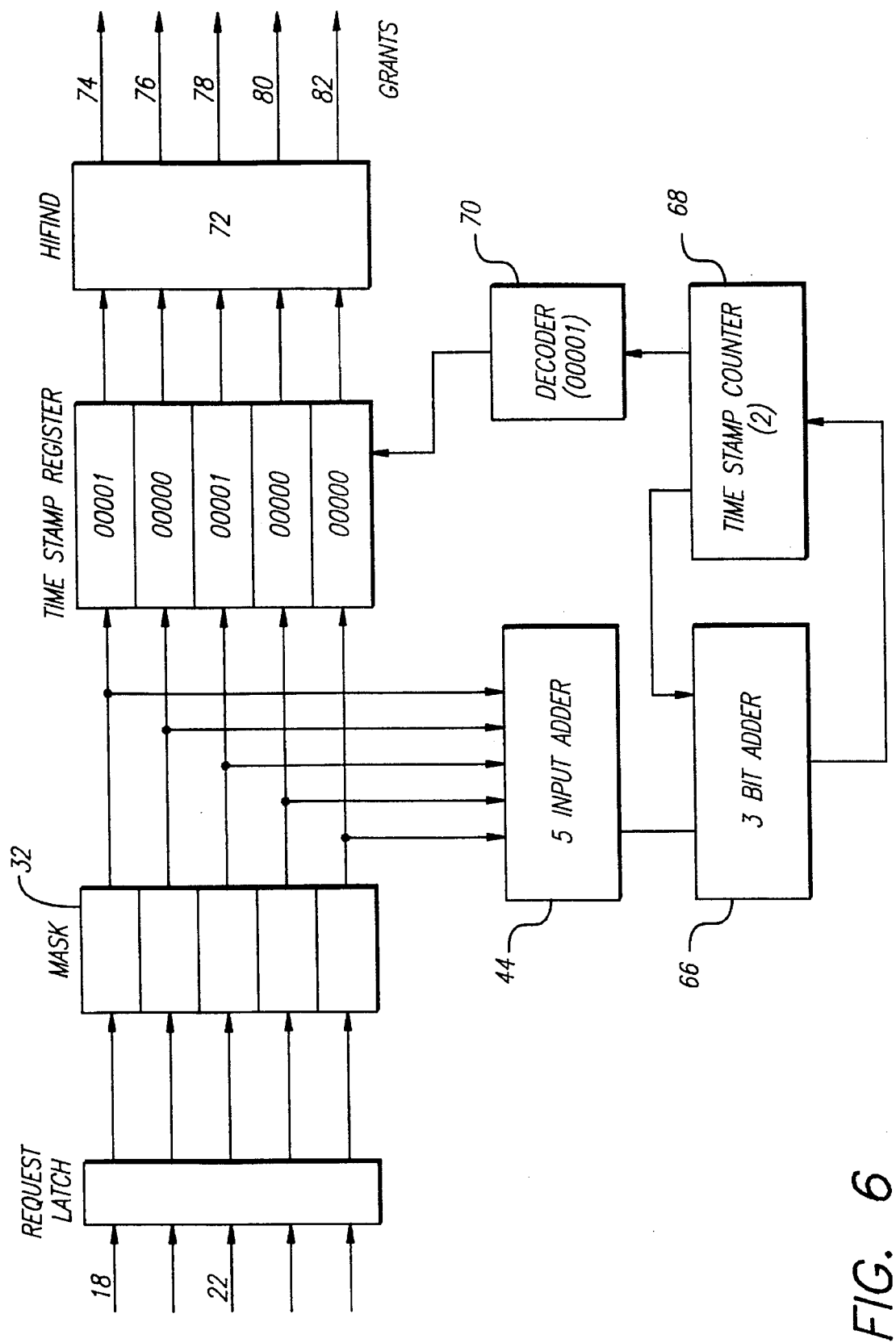
FIG. 6 is a schematic similar to FIG. 2 showing two clients simultaneously requesting access to a resource.
Figure 7:
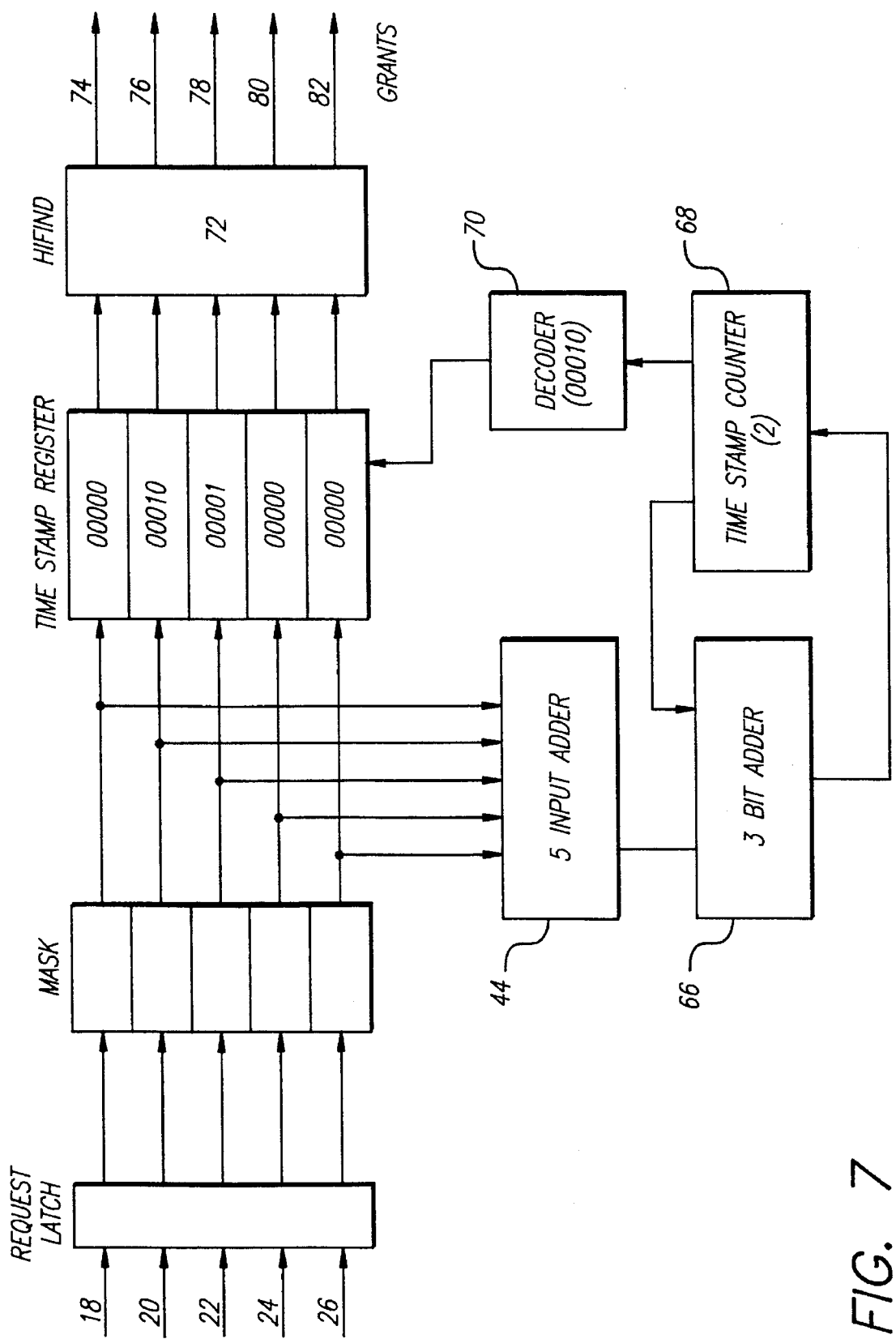
FIG. 7 is a schematic similar to FIG. 6 showing an additional client requesting access to the resource.

Referring to FIG. 6, in operation the first 18 and third 22 clients may simultaneously seek access to the resource in a first clock cycle. The time stamp counter has a value of 0. Upon receiving the access requests, the mask and control circuits for the corresponding clients allow the unary value 00001 from the decoder 70 to be loaded into the registers. The least significant bit is also provided to the hifind circuit through the AQSQUEUEF pins of the bit circuits. In accordance with the hifind hierarchy, the hifind provides access to the first client. The number of clients requesting access are added by the adders and stored within the time stamp counter, wherein the value of the time stamp counter is 2.

As shown in FIG. 2, in a second clock cycle, the first client may finish accessing the resource and generate an AQCLASTF signal which causes the time stamp counter 68 to decrement a single unit, wherein the value of the time stamp counter becomes a 1. The contents of first client register are also shifted to the right so that the contents of the register is 00000. Because the least significant bit of the third client register 50 was not latched and not selected by the hifind circuit, the AQCLATCHF is maintained as active and the contents of the register is maintained as 00001 and not changed to the contents of the time stamp counter 00010. Within the second clock cycle the second client may request access to the resource. The request causes the contents of the time stamp counter to be loaded into the corresponding register as unary value 00010. The hifind circuit grants the third client access to the resource and the process is repeated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A first come first serve scheduler mechanism for a plurality of clients that generate access request for a resource, comprising:

a signal conversion circuit which converts a plurality of requests into a plurality of associated time stamp input signals;

a time stamp generation circuit which receives said time stamp input signals and generates coded time stamp output values that correspond to an order of receipt of said time stamp input signals, said time stamp generation circuit includes a time stamp counter which counts each time stamp input signal when said time stamp input signal is generated by said signal conversion Circuit and decrements one unit after a client has released the resource;

a plurality of time stamp registers that receive and store said coded time stamp output values; and, a hifind circuit that reads said plurality of time stamp registers and generates an output signal in accordance with a predetermined hierarchy and which allows a client access to the resource.

2. The mechanism as recited in claim 1, wherein the requests are received by said signal conversion circuit at a first time and a second time which is later than said first time, wherein said hierarchy includes generating said output signal that corresponds to said request at said first time and then generates a subsequent output signal that corresponds to said request at said second time.

3. The mechanism as recited in claim 1, wherein said time stamp generation circuit includes a first adder that adds said time stamp input signals and generates a first adder output value, and a second adder that adds said first adder output value to a first time stamp counter value and generates a second adder output value which increments said time stamp counter to a second time stamp counter value.

4. The mechanism as recited in claim 4, wherein said time stamp generation circuit includes a decoder which converts said second time stamp counter value to said time stamp output value.

5. The mechanism as recited in claim 3, wherein said signal conversion circuit includes a request latch that latches said request and generates a plurality of time stamp input signals that are provided to said first adder and said plurality of time stamp registers, and a mask circuit that can mask said time stamp input signals.

6. The mechanism as recited in claim 1, wherein said hifind circuit reads a least significant bit of each of said plurality of time stamp registers.

7. A computer system with a first come first serve mechanism, the computer system comprising:

a resource;

a plurality of clients including
a first client that generates a first request for access to said resource, and
a second client that generates a second request for access to said resource; and a scheduler mechanism coupled to said resource and said plurality of clients, said scheduler includes
a signal conversion circuit which converts said requests into a plurality of associated time stamp input signals, a time stamp generation circuit which receives said time stamp input signals and generates coded time stamp output values that correspond to an order of receipt of said time stamp input signals, said time stamp generation circuit includes a time stamp counter which counts each time stamp input signal when said time stamp input signal is generated by said signal conversion circuit and decrements one unit after a client has released the resource, a plurality of time stamp registers that receive and store said coded time stamp output values, and, a hifind circuit that reads said plurality of time stamp registers and generates an output signal in accordance with a predetermined hierarchy, said output signal being provided to a client to allow access to said resource.

8. The system as recited in claim 7, wherein said first request is received by said signal conversion circuit at a first time and said second request is received at a second time which is later than said first time, wherein said hierarchy includes generating said output signal that corresponds to said request at said first time and then generates a subsequent output signal that corresponds to said request at said second time.

9. The system as recited in claim 7, wherein said time stamp generation circuit of said scheduler mechanism includes a first adder that adds said time stamp input signals and generates a first adder output value, and a second adder that adds said first adder output value to a first time stamp counter value and generates a second adder output value which increments said time stamp counter to a second time stamp counter value.

10. The system as recited in claim 9, wherein said time stamp generation circuit of said scheduler mechanism includes a decoder which converts said second time stamp counter value to said time stamp output value.

11. The system as recited in claim 9, wherein said signal conversion circuit of said scheduler mechanism includes a request latch that latches said request and generates a plurality of time stamp input signals that are provided to said first adder and said plurality of time stamp registers, and a mask circuit that can mask said time stamp input signals.

12. The system as recited in claim 7, wherein said hifind circuit of said scheduler mechanism reads a least significant bit of each of said time stamp registers.

13. A first come first serve scheduler mechanism for a plurality of clients that generate access request for a resource, comprising:

signal conversion circuit means for converting the requests into a plurality of associated time stamp input signals;

time stamp generation circuit means for receiving said time stamp input signals and for generating coded time stamp output values that correspond to an order of receipt of said time stamp input signals, said time stamp generation circuit means includes a time stamp counter means for counting each time stamp input signal when said time stamp input signal is generated by said signal conversion circuit means and decrements one unit after a client has released a resource;

time stamp register means for receiving and storing said coded time stamp output values; and, hifind circuit means for reading said time stamp registers and for generating an output signal in accordance with a predetermined hierarchy and which allows a client access to the resource.

14. The mechanism as recited in claim 13, wherein said requests are received by said signal conversion circuit means at a first time and a second time which is later than said first time, wherein said hierarchy includes generating said output signal that corresponds to said request at said first time and then generates a subsequent output signal that corresponds to said request at said second time.

15. The mechanism as recited in claim 13, wherein said time stamp generation circuit means includes first adder means for adding said time stamp input signals and generating a first adder output value, and second adder means for adding said first adder output value to a first time stamp counter value and generating a second adder output value which increments said time stamp counter means to a second time stamp counter value.

16. The mechanism as recited in claim 15, wherein said time stamp generation circuit means includes decoder means for converting said second time stamp counter value to said time stamp output value.

17. The mechanism as recited in claim 15, wherein said signal conversion circuit means includes request latch means for latching said requests and generating a plurality of time stamp input signals that are provided to said first adder means and said time stamp register means, and masking means for masking said time stamp input signals.

18. The mechanism as recited in claim 13, wherein said hifind circuit means reads a least significant bit of each of said time stamp registers means.

19. A computer system with first come first serve mechanism, comprising:

a resource;

a plurality of clients including
a first client that generates a first request for access to said resource, and
a second client that generates a second request for access to said resource; and scheduler means for enabling at least one of said plurality of clients access to said resource, said scheduler means includes signal conversion circuit means for converting said requests into a plurality of associated time stamp input signals, time stamp generation circuit means for receiving said time stamp input signals and for generating coded time stamp output values that correspond to an order of receipt of said time stamp input signals, said time stamp generation circuit means includes a time stamp counter means for counting each time stamp input signal when said time stamp input signal is generated by said signal conversion circuit means and decrements one unit after a client has released the resource, time stamp register means for receiving and storing said coded time stamp output values, and, hifind circuit means for reading said time stamp register means and for generating an output signal that in accordance with a predetermined hierarchy, said output signal being provided to a client to allow access to said resource.

20. The system as recited in claim 19, wherein said requests are received by said signal conversion circuit means at a first time and a second time which is later than said first time, wherein said hierarchy includes generating said output signal that corresponds to said request at said first time and then generates a subsequent output signal that corresponds to said request at said second time.

21. The system as recited in claim 19, wherein said time stamp generation circuit means includes first adder means for adding said time stamp input signals and generating a first adder output value, and second adder means for adding said first adder output value to a first time stamp counter value and generating a second adder output value which increments said time stamp counter means to a second time stamp counter value.

22. The system as recited in claim 21, wherein said time stamp generation circuit means includes decoder means for converting said second time stamp counter value to said time stamp output value.

23. The system as recited in claim 21, wherein said signal conversion circuit means includes request latch means for latching said requests and generating a plurality time stamp input signals that are provided to said first adder means and said time stamp register means, and masking means for masking said time stamp input signals.

24. The system as recited in claim 19, wherein said hifind circuit means reads a least significant bit of each of said time stamp register means.

* * * * *

UNITED STATES PATENT AND TRADEMARK OFFICE
CERTIFICATE OF CORRECTION

PATENT NO. : 5,574,867
DATED : November 12, 1996
INVENTOR(S) : Manpreet S. Khaira It is certified that error appears in the above-indentified patent and that said Letters Patent is hereby corrected as shown below:

In column 6 at line 41 delete "claim 4," and insert --claim 3--

Signed and Sealed this

Fifteenth Day of April, 1997

*Attest:*

BRUCE LEHMAN

*Attesting Officer*     *Commissioner of Patents and Trademarks*